US008108599B2

(12) United States Patent
Rector et al.

(10) Patent No.: US 8,108,599 B2
(45) Date of Patent: Jan. 31, 2012

(54) ERASURE TECHNIQUES FOR EMULATING STREAMED DATA FORMAT FOR NON TAPE MEDIA

(75) Inventors: Richard Douglas Rector, Arvada, CO (US); Larry Alan Fenske, Loveland, CO (US)

(73) Assignee: Spectra Logic Corporation, Boulder, CO (US)

( * ) Notice: Subject to any disclaimer, the term of this patent is extended or adjusted under 35 U.S.C. 154(b) by 1505 days.

(21) Appl. No.: 11/123,725

(22) Filed: May 6, 2005

(65) Prior Publication Data

US 2006/0095657 A1 May 4, 2006

Related U.S. Application Data

(63) Continuation-in-part of application No. 10/980,594, filed on Nov. 3, 2004, now Pat. No. 7,788,299.

(51) Int. Cl.
G06F 12/00 (2006.01)
(52) U.S. Cl. ........ 711/112; 711/159; 711/162; 711/165; 707/645
(58) Field of Classification Search .................. 711/159, 711/208, 162, 165, 112; 707/100, 206, E17.002, 707/E17.008, 645
See application file for complete search history.

(56) References Cited

U.S. PATENT DOCUMENTS

| | | | |
|---|---|---|---|
| 5,265,159 A * | 11/1993 | Kung | 713/193 |
| 5,463,772 A | 10/1995 | Thompson et al. | |
| 5,630,092 A | 5/1997 | Carreiro et al. | |
| 5,842,226 A * | 11/1998 | Barton et al. | 711/203 |
| 5,920,873 A | 7/1999 | Van Huben et al. | |
| 6,021,415 A * | 2/2000 | Cannon et al. | 1/1 |
| 6,094,654 A | 7/2000 | Van Huben et al. | |
| 6,138,201 A | 10/2000 | Rebalski | |
| 6,532,121 B1 | 3/2003 | Rust et al. | |
| 6,636,942 B2 * | 10/2003 | Greco | 711/112 |

(Continued)

FOREIGN PATENT DOCUMENTS

WO  WO 2005/010661 A2   2/2005

(Continued)

OTHER PUBLICATIONS

U.S. Appl. No. 10/950,613, Starr et al.

(Continued)

Primary Examiner — Matthew Bradley
(74) Attorney, Agent, or Firm — Kenneth Altshuler

(57) ABSTRACT

Disclosed is a method and apparatus relating generally to erasure techniques for emulating a streamed data format for non tape media capable of being used with a data storage arrangement to generate replenished user data space. The data storage arrangement comprises a host computer and a storage system in communication with the host computer, the storage system comprising at least one random access storage medium. The random access storage medium is capable of receiving data by streaming protocol and storing the data emulated in a contiguous format. The data comprises at least one data file which further comprise a plurality of records wherein each of the records comprise user data and meta data. A deletion algorithm is adapted to issue at least one deletion command capable of deleting at least one portion of the data stored on the medium up to at least a last segment of the data to create replenished storage space. The replenished storage space is capable for storage of new data in an order following the last segment of data upon receiving the new data in the streaming protocol by the storage medium.

22 Claims, 12 Drawing Sheets

U.S. PATENT DOCUMENTS

| | | |
|---|---|---|
| 6,708,166 B1 | 3/2004 | Dysart et al. |
| 6,718,427 B1 | 4/2004 | Carlson et al. |
| 6,766,520 B1 | 7/2004 | Rieschl et al. |
| 7,146,476 B2 * | 12/2006 | Sandorfi et al. ............... 711/162 |
| 2002/0064118 A1 | 5/2002 | Korfin et al. |
| 2002/0144044 A1 | 10/2002 | Moon et al. |
| 2003/0028718 A1 * | 2/2003 | Blendermann et al. ....... 711/111 |
| 2003/0135672 A1 | 7/2003 | Yip et al. |
| 2004/0059649 A1 * | 3/2004 | Sakuma et al. ................. 705/28 |
| 2004/0105187 A1 | 6/2004 | Woodruff et al. |
| 2004/0111676 A1 | 6/2004 | Jang et al. |
| 2004/0143597 A1 | 7/2004 | Benson et al. |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

FOREIGN PATENT DOCUMENTS

| | | |
|---|---|---|
| WO | PCT/US2005/045168 | 12/2005 |
| WO | PCT/US2005/046447 | 12/2005 |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

ERASURE TECHNIQUES FOR EMULATING STREAMED DATA FORMAT FOR NON TAPE MEDIA

CROSS-REFERENCE TO RELATED APPLICATIONS

This application is a continuation-in-part of U.S. patent application Ser. No. 10/980,594 now U.S. Pat. No. 7,788,299, entitled: File Formatting on a Non-Tape Media Operable with a Streaming Protocol, filed on Nov. 3, 2004, which application is incorporated herein by reference in its entirety.

FIELD OF THE INVENTION

The present invention relates generally to erasure techniques for emulating streamed data format for non tape media to generate replenished user data space.

BACKGROUND

Tape libraries have historically been the primary storage devices for amassed digital data. This has been due in part because of the tape libraries' ability to store considerably large amounts of data in a cost-efficient and data-stable manner. Other types of storage systems containing alternative media such as disc drives, however, are beginning to gain momentum as a consequence of advancements in the technology. Disc drive-based systems generally facilitate an additional level of flexibility in the way data is stored. Depending on the configuration of the storage system, the random access functionality of disc drives can dramatically speed up data transfer between a host and storage system. Such advances are evident in a Virtual Tape Library (VTL) which is a leading alternative to the traditional tape library.

VTLs are generally promoted as faster, more versatile backup systems than the traditional tape-based libraries. A VTL works by emulating legacy tape libraries by operating with standard tape backup software, such as Veritas backup software from Veritas Corporation of Mountain View, Calif. Put simply, a VTL presents the appearance of a tape library of almost any make and model to a host. Hence, data can be transmitted to a VTL in streaming protocol whereby data can be stored on media as a contiguous data packet emulating the linear last-in/last-stored format of tape media.

One limitation inherent in all recording media includes limited storage capacity. This is generally addressed by replenishing space for new data storage with compression techniques or simple data deletion. When such practices are employed with data stored in a streaming protocol on tape media, certain restrictions exist. For example, data stored sequentially on tape media in a relative order of first-in/first-stored to last-in/last-stored are deleted contiguously to include data last-stored. This methodology is followed because the data stored on tape is generally contiguous from file to file due to the linear nature of tape media. Thus, having gaps of useable space from intermittent deleted files in the data stream would most likely create complex data management challenges to store new data in streaming protocol on the useable space.

The invention described herein is, therefore, generally directed to leveraging the benefits of non-tape media for use by systems and software that typically are specialized to work with tape media.

SUMMARY OF THE INVENTION

The present invention relates generally to erasure techniques for emulating a steamed data format for non tape media to generate replenished user data space and provides a method and apparatus to selectively delete data within a data stream while organizing the remaining data in an emulated contiguous format preceding user data space.

One embodiment of the present invention can therefore comprise data storage arrangement comprising: a host computer; a storage system in communication with the host computer, the storage system comprising at least one random access storage medium; the random access storage medium capable of receiving data by streaming protocol and storing the data emulated in a contiguous format; the data comprising at least one data file; the data file comprising a plurality of records; each of the records comprising user data and meta data; a deletion algorithm adapted to issue at least one deletion command capable of deleting at least one portion of the data stored on the medium up to at least a last segment of the data to create replenished storage space; the replenished storage space capable for storage of new data in an order following the last segment of data upon receiving the new data in the streaming protocol by the storage medium.

An alternative embodiment of the present invention can therefore comprise a method for replenishing storage space on a non-tape storage medium comprising the steps of: storing data from a tape medium format to the non-tape storage medium; deleting at least one portion of the data emulated in a contiguous format up to a last segment of the data to create replenished storage space; and using the replenished storage space for storing new data in an order following the last segment of data from the tape medium format to the non-tape medium.

In yet another alternative embodiment of the present invention can therefore comprise a means for replenishing storage space on a non-tape storage medium comprising: means for storing data from a tape medium format to the non-tape storage medium; means for deleting a portion of the data up to a last segment of the data to create replenished storage space; and means for utilizing the replenished storage space for storing new data in an order following the last segment of data from the tape medium format to the non-tape medium.

In yet another alternative embodiment of the present invention can therefore comprise a library for storing and retrieving data, comprising at least one non-tape medium having a storage capacity and data stored therein in a tape medium format, wherein the storage capacity of the non-tape medium is refreshed by deleting at least one portion of the data emulated in a contiguous format up to a last segment of the data.

DETAILED DESCRIPTION

Figure 1:
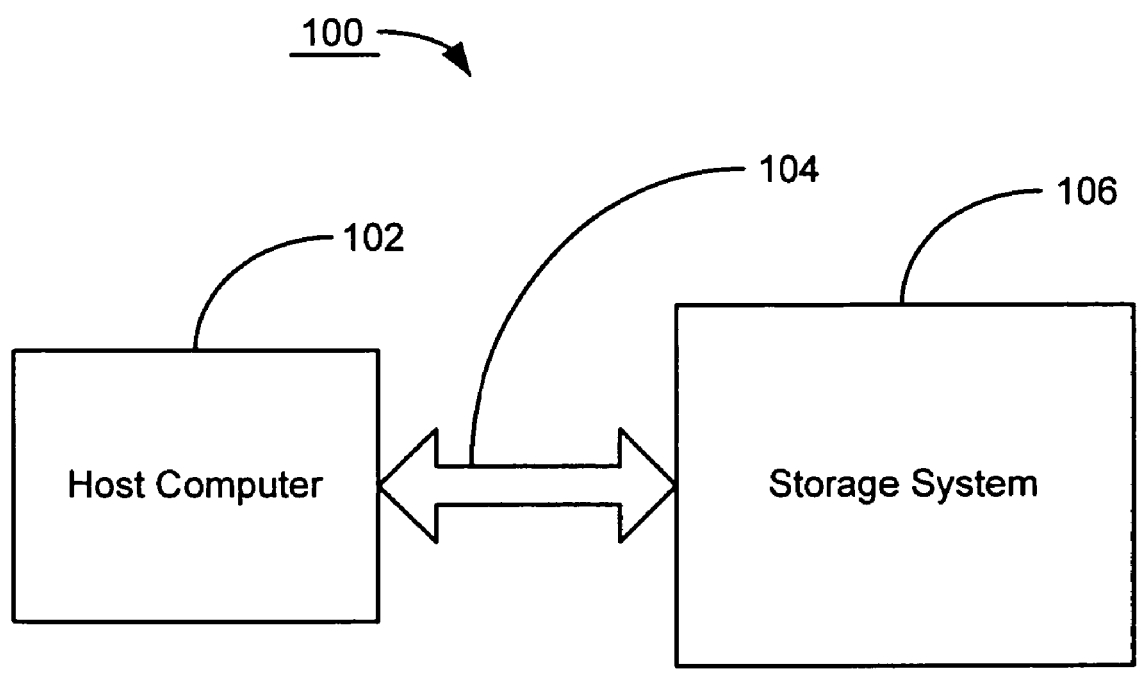
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a storage system 106. The host computer 102 can be a personal computer, a main frame computer, a server, a workstation or any computer system linked to the storage system 106, just to name a few examples. The communication path 104, at a minimum, needs only to be capable of facilitating communication between the host computer 102 and the storage system 106. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path can be in the form of a wire line pathway, wireless, or a combination thereof, for example. Finally, the storage system 106 is capable of storing and retrieving data for the host 102. Examples of a storage system include a disc drive or multiple disc drives, a storage library, such as a virtual tape library and disc drive magazine library, just to name a few. For purposes of simplicity, communication with the storage system 106 is considered to include communication with the storage system 106 in general and communication directly with components comprising the storage system 106.

Figure 2:
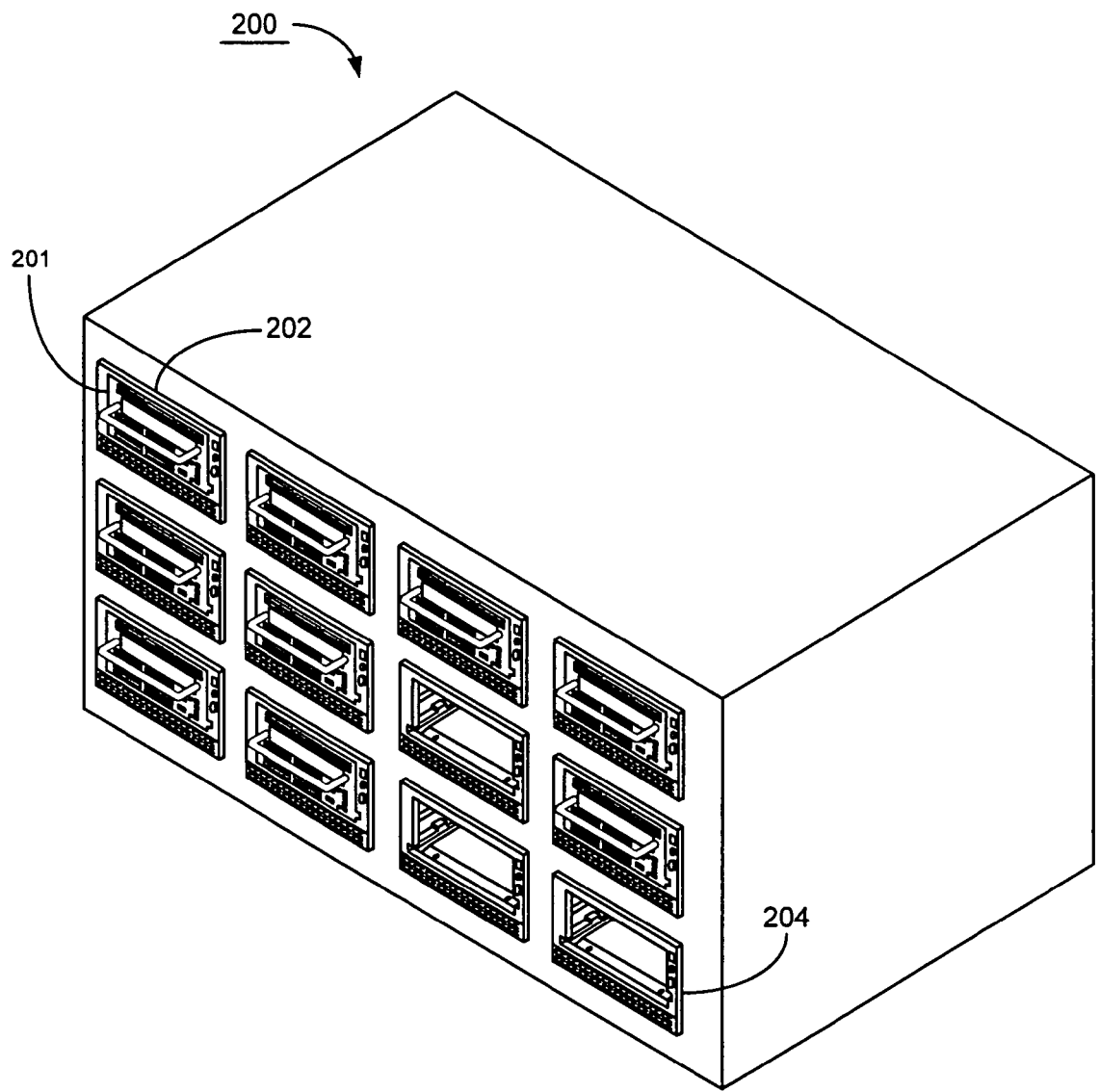
FIG. 2 shows an example of a storage system wherein the present invention can be practiced.

FIG. 2 shows an example of a storage system 106 according to the present invention. Here, a RXT T-950 disc drive magazine library 200 from Spectra Logic Corp. of Boulder, Colo. comprises a plurality of random access memory devices, such as disc drive magazines 201, and docking stations 202 operatively linked to one another to function as the RXT library 200. The disc drive magazines 201 are adapted for mobility, and can be removed from or inserted into a docking station 202 as illustrated by a vacant docking station 204 capable of receiving a disc drive magazine 201, for example. The RXT library 200 is capable of communicating with a host, such as the host 102, via a streaming protocol, such as a format used for tape medium data storage for example.

Figure 3:
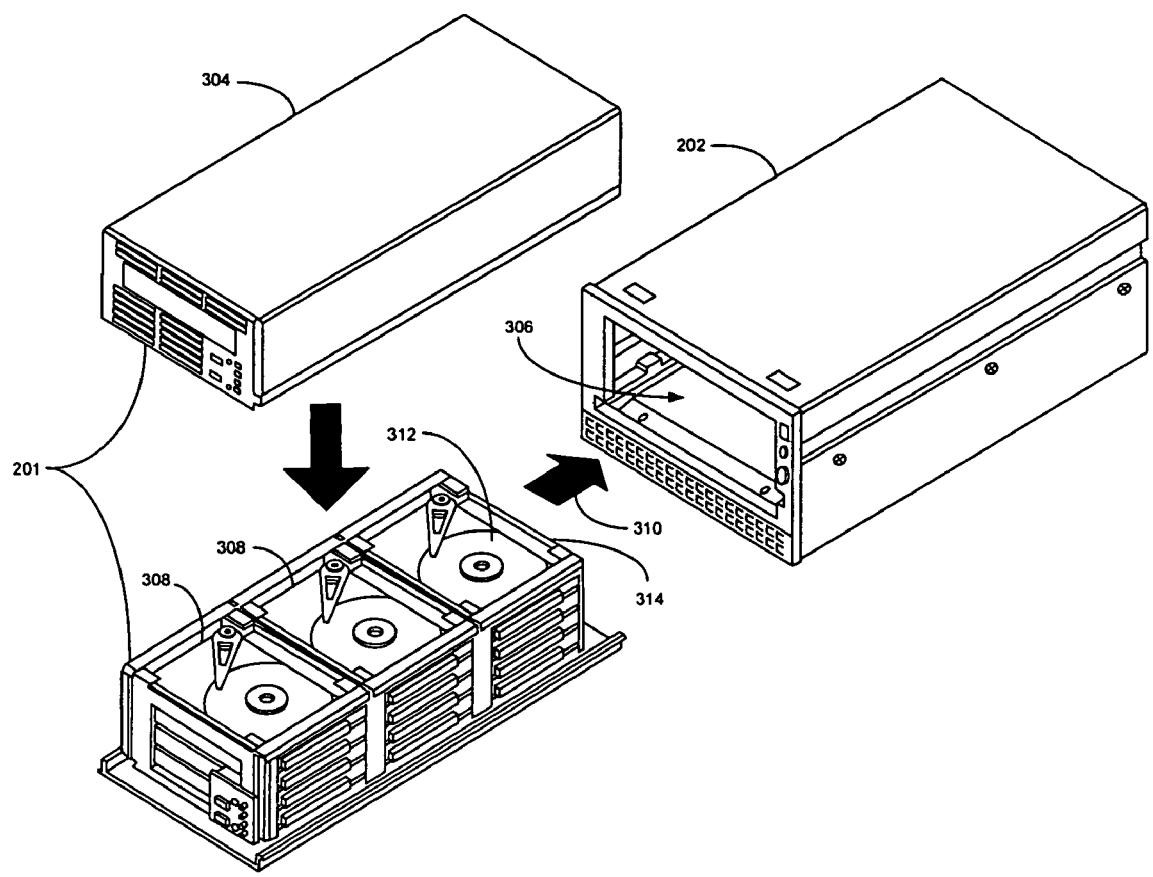
FIG. 3 shows a detailed illustration of an embodiment of a disc drive magazine and docking station.

FIG. 3 shows a more detailed illustration of an embodiment of an RXT disc drive magazine 201 and docking station 202. Here, a plurality of disc drives 308 are shown substantially contained by an enclosure 304 generally comprising the mobile disc drive magazine 201. A conventional magnetic disc drive 308 is only one embodiment of a random access memory device according to the present invention, which, in further embodiments, can include flash memory and optical memory, just to name a few (see below). The mobile disc drive magazine 201 is adapted to be received by an opening 306 in the docking station 202 as shown by the arrow 310. While the docking station 202 is shown as one of a number of stations in the library 200, one of ordinary skill will appreciate that the docking station 202, by itself, could be used as a stand-alone storage system. The engaging surface 314 of the mobile disc drive magazine 201 is adapted with electrical contacts (not shown) to contact with complementary electrical contacts (not shown) on the engaging surface (not shown) of the docking station 202. When contact is made, the transmission of data can occur between the docking station 202 and the mobile disc drive magazine 201. Furthermore, power can be provided to the mobile disc drive magazine 201 by the docking station 202. Power and data transmission provide a cooperatively linked state between the mobile disc drive magazine 201 and the docking station 202. The docking station 202 is capable of being electrically connected with a host device, such as the host computer 102 for example, or other storage device/s, such as the RXT storage library 200 for example, by a coupling means, such as wires, plugs-in, wireless transmission (e.g., IR, RF) or any combination or equivalence thereof. By linking the docking station 202 with the storage system 200, a connected disc drive magazine 201 is effectively in a cooperatively linked state with the storage system 200.

While the claimed invention has utility in any number of different applications, the disc drive magazine library 200 has been provided to illustrate a suitable environment in which the claimed invention can be practiced. Here, the disc drive 308 is an embodiment of a random access non-tape media having certain advantages, such as data retrieval speed, over tape. Other non-tape media having random storage access can include a CD for use with a CDROM or other optical storage media, compact flash, floppy disc, RAM semiconductor memory (i.e., an SDRAM, for example). In one embodiment of the present invention, the host computer 102 is capable of communicating with the disc drive magazine library 200 by using one streaming protocol as if the library 200 was a tape library, i.e., a library comprising only tape media (not shown) for use with tape drives (not shown) for example. As mentioned earlier, communication via a streaming protocol with the virtual tape library is considered to include the virtual tape library in addition to communication with components comprised by the virtual tape library.

Figure 4:
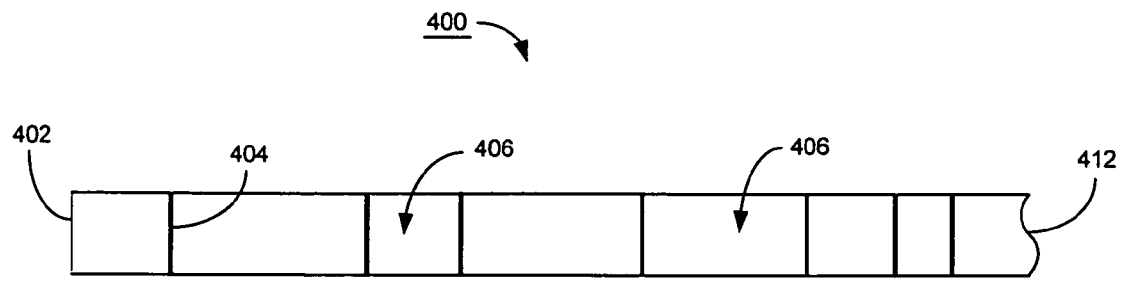
FIG. 4 is a diagram illustrating a typical layout of files saved on a section of tape media used in a tape storage system supporting tape media, such as a tape library.

FIG. 4 is a diagram illustrating a typical layout of files saved on a section of tape media 400 used in a tape storage system supporting tape media, such as a conventional tape library for example. A tape drive generally stores data on a tape as a data steam in a linear manner, in accordance with the streaming protocol from the host 102, in the direction from the beginning 402 of the tape media 400 towards the end 412. Here, the data is stored in the form of files 406 separated by file markers 404. The files 406 are arranged in a contiguous format from a first to a last saved file 406.

Figure 5:
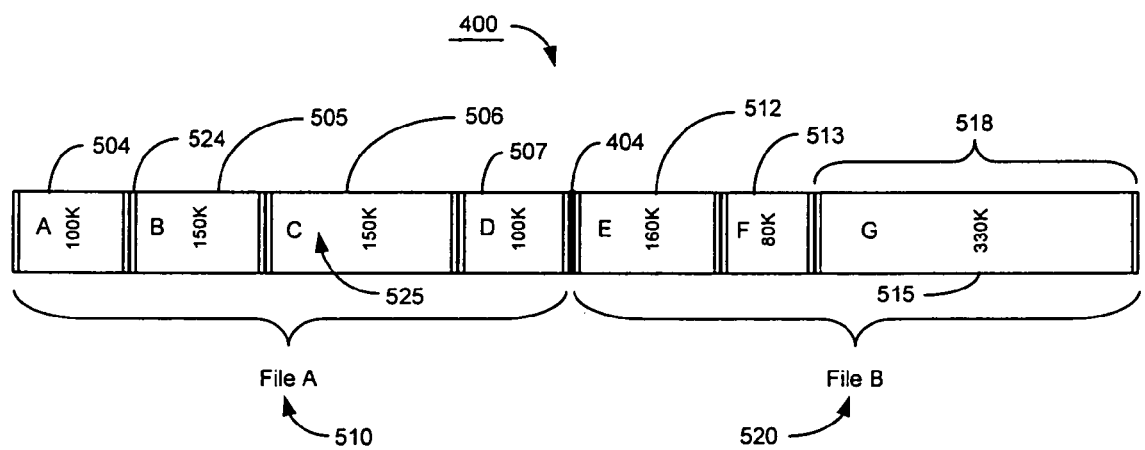
FIG. 5 shows a more detailed perspective of a block diagram from the section of tape media from FIG. 4 illustrating files constructed in a typical configuration for tape media.

Referring now to FIG. 5, shown therein is a more detailed representation of a section of tape media 400 illustrating files 406 constructed in a typical configuration for tape media. Two adjacent files A 510 and B 520, are illustratively configured in a simplified construction. File A 510 comprises four records 504, 505, 506, and 507 of various sizes, shown here as record A (100K) 504, record B (150K) 505, record C (200K) 506 and record D (100K) 507 wherein each record comprises meta data 524 and user data 525. For ease of reference, any of the records shown in FIG. 5 will generically be referred to as "record 518." The data size of each record 518, such as record A 504 and record D 507, can be identical, such as record B 505 and record C 506, or variable, such as record A 504 and record B 505. File B 520 comprises three records 518 of various sizes shown here as record E (160K) 512, record F (80K) 513 and record G (330K) 515. In a tape configuration, the files 406, such as file A 510 and file B 520, and their respective records 518, typically run in sequential and contiguous order because of the linear access nature of tape. A host computer 102 using a streaming protocol generally makes data access requests over the communication path 104 for a storage system 106 with respect to files 406, such as file A 510, and records 518, such as record D 507. An example of streaming protocol instructions follows the logic of spacing forward a certain number of files 406 and space forward a certain number of records 518 (records 518 are also known as blocks in SCSI protocol). The storage system 106 generally searches for a file 406, such as file A 510, using file markers 404 as a counting means. For example, if a host 102 wanted to access file B 520 on a specific tape cassette (not shown) containing the section of tape media 400 shown here, for example, the tape cassette would be scrolled forward from the beginning of the tape medium 402, and the number of file markers 404 encountered would be counted until the correct file marker 404 indicating the beginning of file B 520 was identified. If the host 102 wanted to access the record G 515 in file B 520 then the meta data 524 of each consecutive record starting with record E 512 would be read until record G 515 was encountered. A record 518 of interest can be found by scrolling the tape cassette (not shown) forwards or backwards as necessary based on information about each record 518 stored in the meta data 524 as will be described in more detail below.

Figure 6:
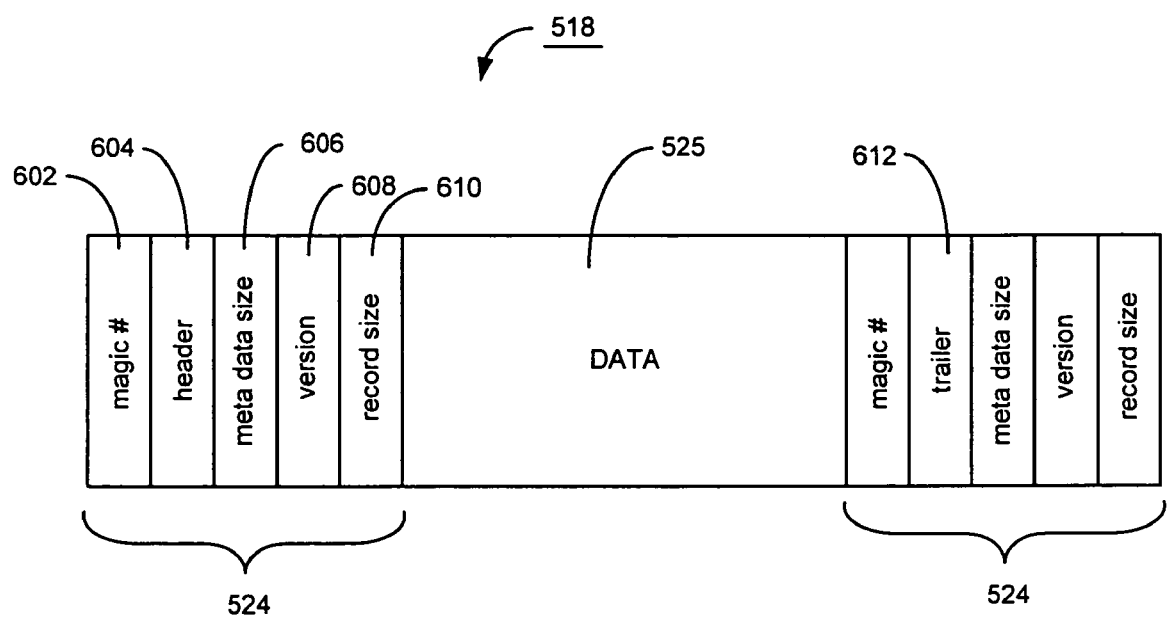
FIG. 6 is a block diagram of a single record in a detail comprising meta data fields and user data.

FIG. 6 is a detailed, illustrative block diagram of a single record 518. However, this is an exemplary configuration only and the fields, comprising the meta data 524 are not limited to the illustrated number of fields or the information content in each field. Here, the meta data 524 is comprised of data fields for and about each record 518 located at both the beginning and end of each record 518, as read when the tape media scrolls by a reading means in the direction (from left to right in this example). As shown in the illustrative embodiment, the following data fields can include a magic number 602 used to alert the system 106, for example, that a new meta data field for a specific record 518 has arrived relative to the reading means. The meta data header 604 is a data field that informs the system 106 that the meta data 524 precedes the user data 525. Alternatively, the meta data trailer 612 is a data field that informs the system 106 that the meta data 524 follows the user data 525. The meta data trailer 612 is contained in meta data 524 at the end of the record 518 for purposes of scrolling tape media in a cassette (not shown) in the reverse direction (as read from right to left in this example) to find a specific record 518, for example. The meta data size 606 and record size 610 contain information about the data size of the meta data field 524 and the user data field 525 respectively. The version field 608 contains a revision number which is information specific to the format of the fields in the record 518.

FIGS. 4, 5 and 6 illustrate a typical layout of files 406 for tape media wherein the files 406, and records 518 are sequential and generally contiguous due to the access methodology of tape media. Contrary to tape media, random access devices, such as disc drives 308, have additional flexibility relative to tape media; they do not require files 406 or records 518 to be stored in a physically sequential or contiguous construction. Disc drives 308 are capable of storing a data entry, which can include one or more tape files 406 and associated records 518, in fractions of the entry disposed in different locations on a disc 312. As known to a skilled artisan, this is made possible because a disc drive 308 typically operates with a data directory that contains location information, in what is called a file system, generally stored as data in a reserved space for each specific drive 308. The data directory is typically accessed by a file system driver in the operating software that manages the directory stored in the disc drive 308. Hence, a random access non-tape media, such as a disc drive 308, uses what is generally known as an operating system data directory wherein the functionality is at the operating system level of a computing system.

A non-tape medium, such as a disc drive 308 (used here as an example of a non-tape medium), can store data in a tape emulated format, which is a format emulating a contiguous data layout, to preserve data directory space required to account for data entries. Multiple files 406 with multiple records 518 intended for tape media can be saved on a disc drive 308 as a single data entry potentially saving a significant amount of accounting space in the disc drive's 308 data directory. Knowledge of the contents of each file 406 and record 518 is contained and managed in the meta data 524 contained in each data entry. Hence, to find a particular record 518 in a particular file 406 would require accessing the file system to identify the specific data entry of interest and then sequentially track through the meta data 524 of each record 518 in each file 406 until the data 525 of interest were found.

Figure 7A:
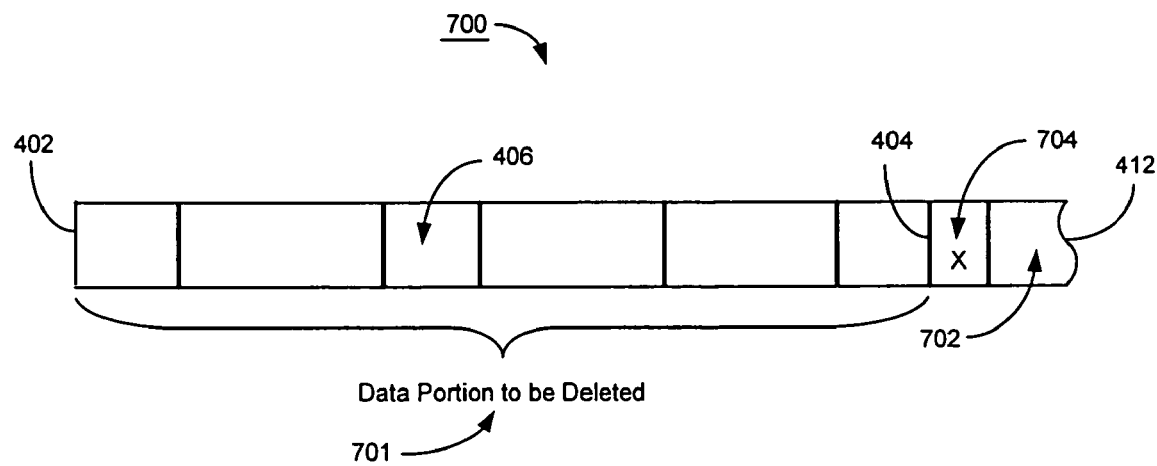
FIG. 7A-C shows block diagrams of files stored in a contiguous tape emulated format on a non-tape medium deleted and reordered in an arrangement consistent with an embodiment of the present invention.
Figure 7B:
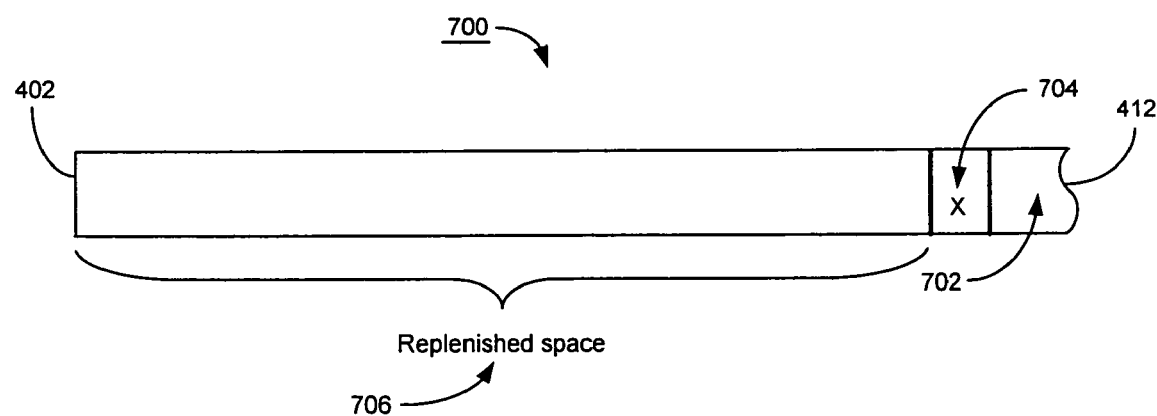
Figure 7C:
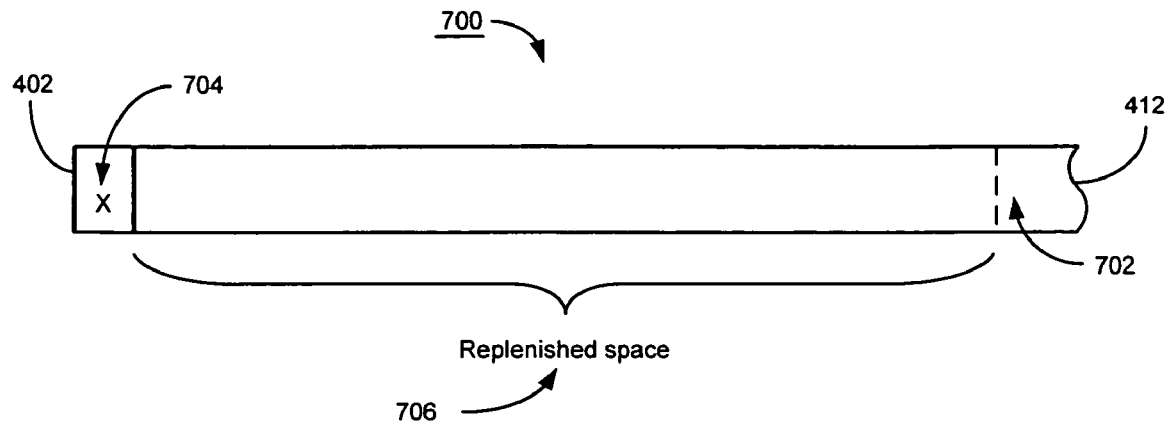

FIG. 7A-C shows block diagrams of files stored in a contiguous tape emulated format on a non-tape medium deleted and reordered in an arrangement consistent with an embodiment of the present invention. A disc drive 308 will be used here as an embodiment for a random access storage media for illustrative purposes. FIG. 7A shows a block diagram of a data entry 701 and 704 on a disc drive 308 comprising an emulated contiguous section of tape, similar to the tape section 400 of FIG. 4. The data entry 701 and 704 can be sent 104 by a host computer 102 to a storage system 106 supporting at least one disc drive 308 capable of receiving data by streaming protocol and storing the data 701 and 704. In one embodiment, the data 701 and 704 can be stored in the same streaming protocol in which it was received or, in an alternative embodiment, the data 701 and 704 can be stored in a different protocol capable of supporting the streaming protocol over which the data 701 and 704 was received. Here, the data comprises a plurality of tape emulated data files 406 and 704, which in turn comprise a plurality of records 518 (not shown in FIG. 7A-C). Each record 518 comprises at least both meta data 524 and user data 525 (not shown in FIG. 7A-C). A deletion algorithm is adapted to issue at least one deletion command capable of deleting a portion of the data 701 stored on the disc drive 308 up to a last segment of data, in this case file X 704 of a tape emulated section 700. Here, the last segment of data 704 is a tape emulated file, however the last segment of data can be a single bit. In this embodiment, the data portion for deletion 701 starts at the beginning 402 of the tape emulated section 700 and ends, or goes "up to", the file marker 404 of the beginning of file X 704. Additionally, the data is stored in order from first saved at the left 402 portion of the tape emulated section 700 to last saved towards the right 412 of the tape emulated section 700. There is also unused space 702 capable of storing additional data in the tape emulated section 700. The deletion algorithm can originate with a host, such as the host computer 102, the system 106, the disc drive 308 or some other means that has access to the data entry 701 and 704. The deletion command can be generated automatically based on a predetermined time limit from when the data portion 701 was originally stored. For example, all the data can be deleted automatically after one month from the original time of data storage. In another embodiment, the deletion command can be initiated to delete the data portion 701 based on expired data. One example of expired data can include data that has aged beyond a time limit, which is not necessarily predetermined, from when the data portion 701 was originally stored. Another example of expired data can include a parameter such as a name of someone who is no longer important or an abandoned project just to name a few. Expired data can include dates, such as July 4, July 17 and September 12, or a quantity of data stored, such as after 50 Gigabytes of data for example. As demonstrated here, there are a number of alternative criteria capable of being used to initiate a deletion command.

FIG. 7B shows one embodiment of a block diagram of the tape emulated section 700 after the deletion command was executed to delete the portion of the data space 701 intended for deletion. Here, the deleted portion of the data 701 can be used as replenished space 706 for storing new data. In this embodiment, the only data remaining in the tape emulated section 700 is the data associated with file X 704. For purposes of illustration, the replenished space 706 is organized here in the same geometric location as the data portion 701 on the tape emulated section 700.

FIG. 7C shows an embodiment of a block diagram of the tape emulated section 700 after the deletion command was executed wherein the last segment of data is reordered. Here, the last segment of data, file X 704, is reordered so that the replenished storage space 706 is capable of storing new data in an order following file X 704. File X 704 is reordered to the beginning 402 of the tape emulated section 700 so that new data received in the streaming protocol by the disc drive 308 through the storage system 106 will follow file X 704. Hence, file X 704 will now become the oldest data saved in the tape emulated section 700 in this embodiment. The unused space 702 capable of storing additional data in the tape emulated section 700 is capable of merging with the replenished space 706 extending towards the end 412 of the tape emulated section 700. It should be noted that FIG. 7B is illustrative to show the reordering of file X 702 but is not required to be an intermediate arrangement between FIGS. 7A and 7C.

Figure 8A:
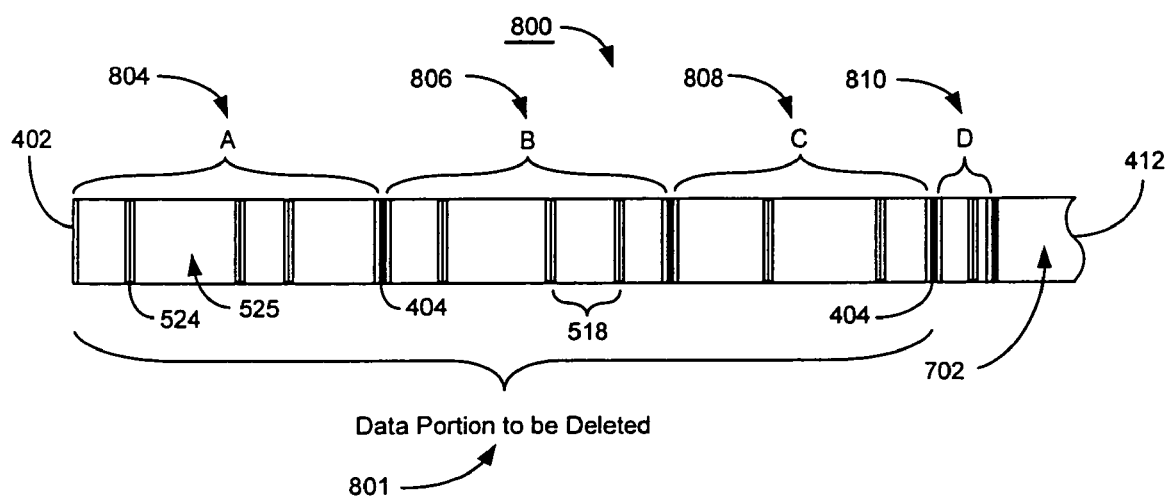
FIG. 8A-C shows block diagrams of files stored in a contiguous tape emulated format on a non-tape medium deleted and reordered in an arrangement consistent with an alternative embodiment of the present invention.
Figure 8B:
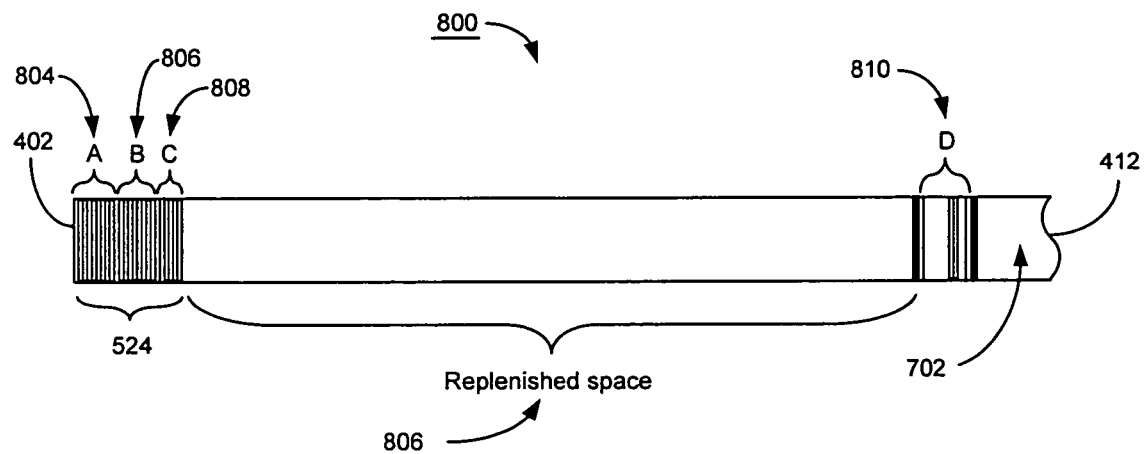
Figure 8C:
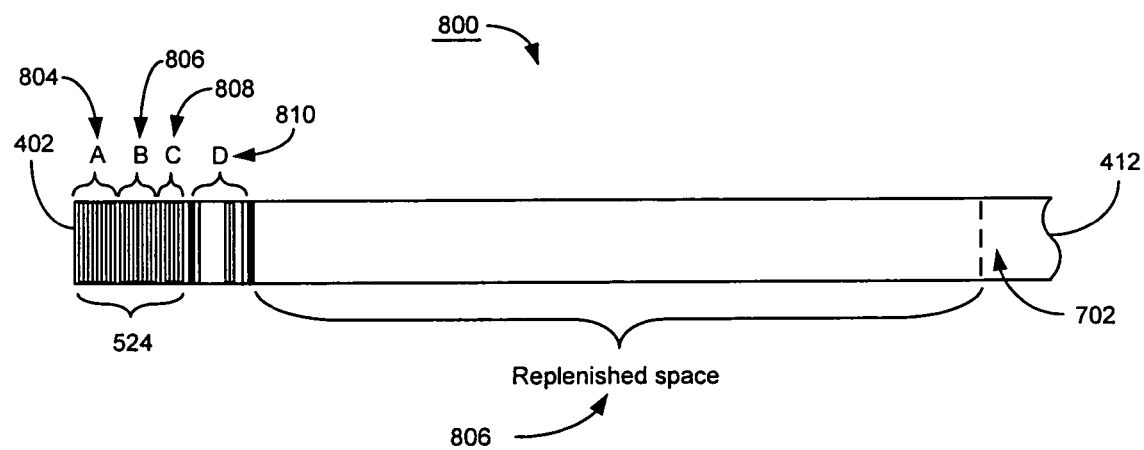

FIG. 8A-C shows block diagrams of files stored in a contiguous tape emulated format on a non-tape medium deleted and reordered in an arrangement consistent with an alternative embodiment of the present invention. Again, a disc drive 308 will be used here as an embodiment for a random access storage media for illustrative purposes. FIG. 8A shows a block diagram of a data entry comprising files A 804, B 806, C 808 and D 810 on a disc drive 308 comprising a tape emulated section 800 arranged in an emulated contiguous format. In this embodiment, the user data 525 and the meta data 524 comprising each record 518 shown. As previously disclosed, the tape emulated section 800 can comprise data received by the disc drive 308 though the storage system 106 in a streaming protocol from a host computer 102, for example. A deletion algorithm is adapted to issue at least one deletion command capable of deleting a portion of the data 801 stored on the disc drive 308 up to a last segment of data, in this case file D 810 of the tape emulated section 800. Here, the last segment of data 810 is a tape emulated file, however the last segment of data can be a single bit of data. In this embodiment, the data portion for deletion 801 starts at the beginning 402 of the tape emulated section 800 and ends, or goes "up to", the file marker 404 of the beginning of file D 810. Additionally, the data is stored in order from first saved at the left 402 portion of the tape emulated section 800 to last saved towards the right 412 of the tape emulated section 800. There is also unused space 702 capable of storing additional data in the tape emulated section 800. As previously disclosed, the deletion algorithm can originate with a host, such as the host computer 102, the system 106, the disc drive 308 or some other means that has access to the data entry files A 804, B 806, C 808 and D 810 and the deletion command can be initiated by a number of alternative criteria.

FIG. 8B shows one embodiment of a block diagram of the tape emulated section 800 after the deletion command was executed to delete the portion of the data space 801 intended for deletion. Here, the deleted portion of the data 801 can be used as replenished space 806 for storing new data. In this embodiment, only the user data 525 was deleted and the meta data for each record 518 from the deleted files A 804, B 806 and C 808 was retained. This storage format can have advantages including accessing information about the deleted user data 525 from the retained meta data 524. Such information can be used to identify the location of the deleted user data 525 residing on one or more archived media elements, such as a tape cassette for example, that may have been used to back up all data prior to deletion or to identify a user of the host computer 102 that ordered the deletion. Here, file D 810 is preserved from deletion as the last segment of data in the tape emulated section 800. For purposes of illustration, the replenished space 806 is organized here in the same location as the data portion 801 on the tape emulated section 800 with the meta data 525 compressed in a contiguous format.

FIG. 8C shows an embodiment of a block diagram of the tape emulated section 800 after the deletion command was executed wherein the last segment of data is reordered. Here, the last segment of data, file D 810, is reordered so that the replenished storage space 806 is capable of storing new data in an order following the file D 810. File D 810 is reordered to a location just following the meta data 524 of file C 808 so new data received in the streaming protocol by the disc drive 308 will follow file D 810, in addition to the meta data 524 for files A 804, B 806 and C 808. Hence, file D 810 will now contain the oldest user data 825 saved in the tape emulated section 800 in this embodiment. The unused space 702 capable of storing additional data in the tape emulated section 800 is capable of merging with the replenished space 806 extending towards the end 412 of the tape emulated section 800. It should be noted that FIG. 8B is illustrative to show the reordering of file D 810 but is not required to be an intermediate arrangement between FIGS. 8A and 8C.

Figure 9A:
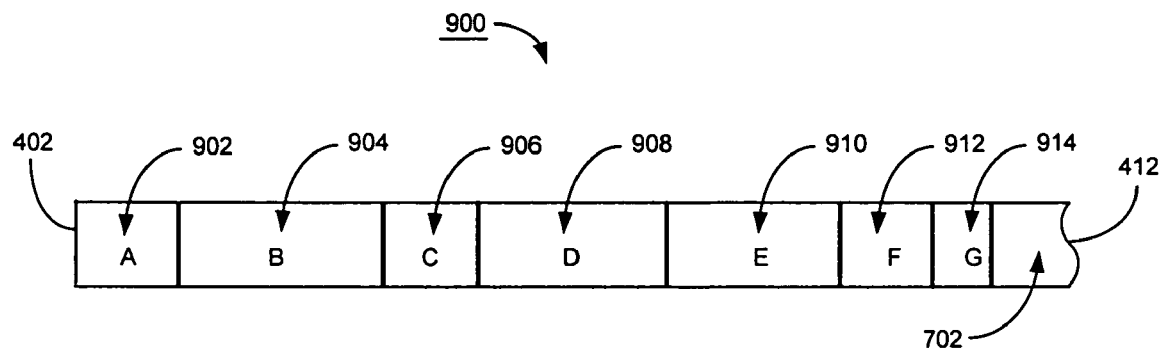
FIG. 9A-C shows block diagrams of files stored in a contiguous tape emulated format on a non-tape medium deleted and reordered in an arrangement consistent with an yet another alternative embodiment of the present invention.
Figure 9B:
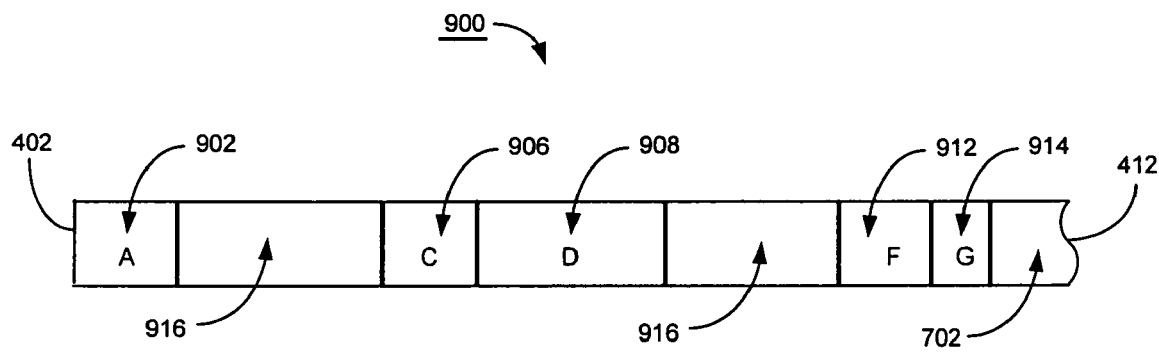
Figure 9C:
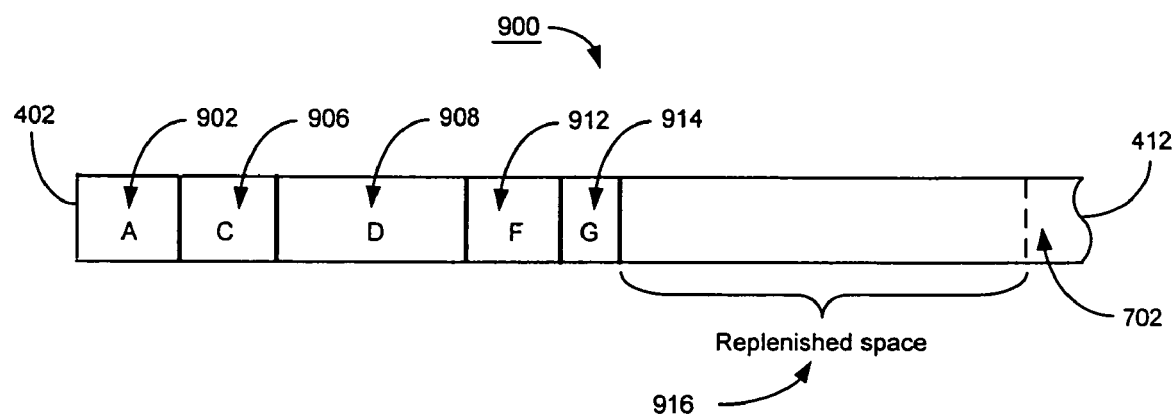

FIG. 9A-C shows block diagrams of files stored in a contiguous tape emulated format on a non-tape medium deleted and reordered in an arrangement consistent with yet another alternative embodiment of the present invention. Again, a disc drive 308 will be used here as an embodiment for a random access storage media for illustrative purposes. FIG. 9A shows a block diagram of a data entry comprising files A 902, B 904, C 906, D 908, E 910, F 912 and G 914 on a disc drive 308 comprising an emulated tape section 900 arranged in an emulated contiguous format. As previously disclosed, the tape emulated section 900 can comprise data received by the disc drive 308 through the storage system 106 in a streaming protocol from a host computer 102, for example. A deletion algorithm is adapted to issue at least one deletion command capable of deleting at least one portion of the data stored on the disc drive 308 post at least a first segment of the data. In this example, there are two portions of data to be deleted, file B 904 and file E 910, of the tape emulated section 900. Data that is post a first segment of data is data following the first segment in emulated sequence, such as file A 902, and up to but not including a last segment of data, such as file G 914, as shown here for example. File B 904 and file E 910 are non contiguous data portions relative to the emulated tape section 900, and both post-file A 902 There is also unused space 702 capable of storing additional data in the tape emulated section 900. In the embodiment of FIG. 9A-C, the emulated data is stored in order from first saved at the left 402 portion of the tape emulated section 900 to last saved towards the right 412 of the tape emulated section 900.

FIG. 9B shows a block diagram of one embodiment of the tape emulated section 900 after the deletion command was executed to delete the portions of the data, file B 904 and file E 910, intended for deletion. Here, the deleted portion of the data, file B 904 and file E 910, can be used as replenished space 916 for storing new data. In this embodiment, files A 902, C 906, D 908, F 912 and G 914 are retained on the emulated section 900. For purposes of illustration, the replenished space 916 is organized here in the same geometric location as the data portions of file B 904 and file E 910 on the tape emulated section 900 of FIG. 9A.

FIG. 9C shows an embodiment of a block diagram of the tape emulated section 900 after the deletion command was executed wherein the remaining data is reordered. Here the remaining segments files A 902, C 906, D 908, F 912 and G 914 are reordered so that the replenished storage space 916 is capable of storing new data in an order following file G 914. Here, files A 902, C 906, D 908, F 912 and G 914 are reordered emulating a contiguous stream of data starting from the file A 902 located at the beginning 402 of the emulated section 900 to file G 914 extending in the direction towards the end 412 of the emulated section 900. Hence, file A 902 will now contain the oldest user data saved in the tape emulated section 900 in this embodiment. The unused space 702 capable of storing additional data in the tape emulated section 900 is capable of merging with the replenished space 916 extending towards the end 412 of the tape emulated section 900. It should be noted that FIG. 9B is illustrative to show the reordering of files B 904 and E 910 but is not required to be an intermediate arrangement between FIGS. 9A and 9C.

Figure 10:
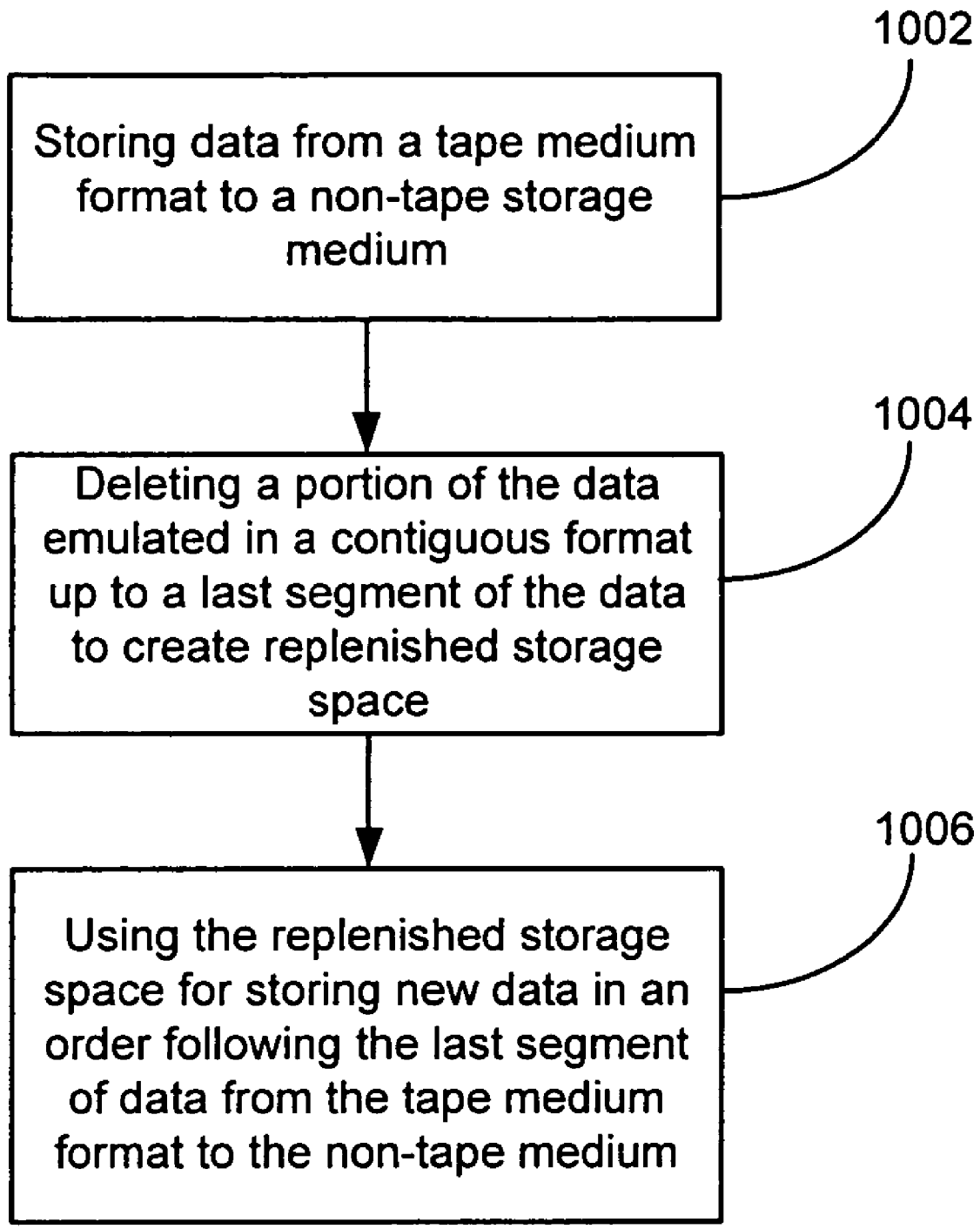
FIG. 10 shows a method for replenishing storage space on a non-tape storage medium consistent with an embodiment of the present invention.

Referring now to FIG. 10, shown therein is a method for replenishing storage space on a non-tape storage medium consistent with the present invention. It should be recognized that the steps presented in the described embodiments of the present invention do not require any particular sequence. In step 1002, data is stored from a tape medium format, such as that used in a streaming protocol, to a non-tape storage medium, such as a disc drive 308. A means for storing data from a tape medium format to the non-tape storage medium can include, on the software side, an algorithm that is capable of making any necessary format conversions for coherent storage of the tape formatted data (such as that written by software engineers internally to Spectra Logic for a RXT system). On the hardware side, the means for storing data can include the necessary communications link (such as communication path 104) to the non-tape storage medium and may include a data storage engine, such as a computer processor device or chip designed specifically for the application for example, that is capable of making any necessary format conversions for coherent storage of the tape formatted data, just to name a few possibilities. In step 1004, a portion of the data is deleted up to a last segment of the data emulated in a contiguous format to create replenished storage space. A means for deleting the portion of the data up to a last segment of the data to create replenished storage space can be by a deletion program capable of executing a command to delete a portion of data based on any number of different parameters as disclosed earlier. The deletion program can be located in a number of places including a host 102 or a non-tape storage medium such as a disc drive 308 just to name a couple of examples. Such a means for deleting a portion of data up to a last segment can be an algorithm that is controlled by a user or can simply be automatic based on a predetermined parameter such as a time limit for example. In step 1006, the replenished storage space can be used for storing new data from the tape medium format to the non-tape medium in an order following the last segment of undeleted data. A means for utilizing the replenished storage space for storing new data in an order following the last segment of data from the tape medium format to the non-tape medium can be accomplished by the storage system 106 or the non-tape medium, such as a disc drive 308, just to name a couple of examples. The use of the replenished storage space, such as the replenished storage space 806 of FIG. 8C, can be for storing tape emulated data in a format consistent with a protocol over which the non-tape medium is receiving data or the data stored can be in some other format with potentially an intermediate conversion means between the received data and the data that is stored.

Figure 11:
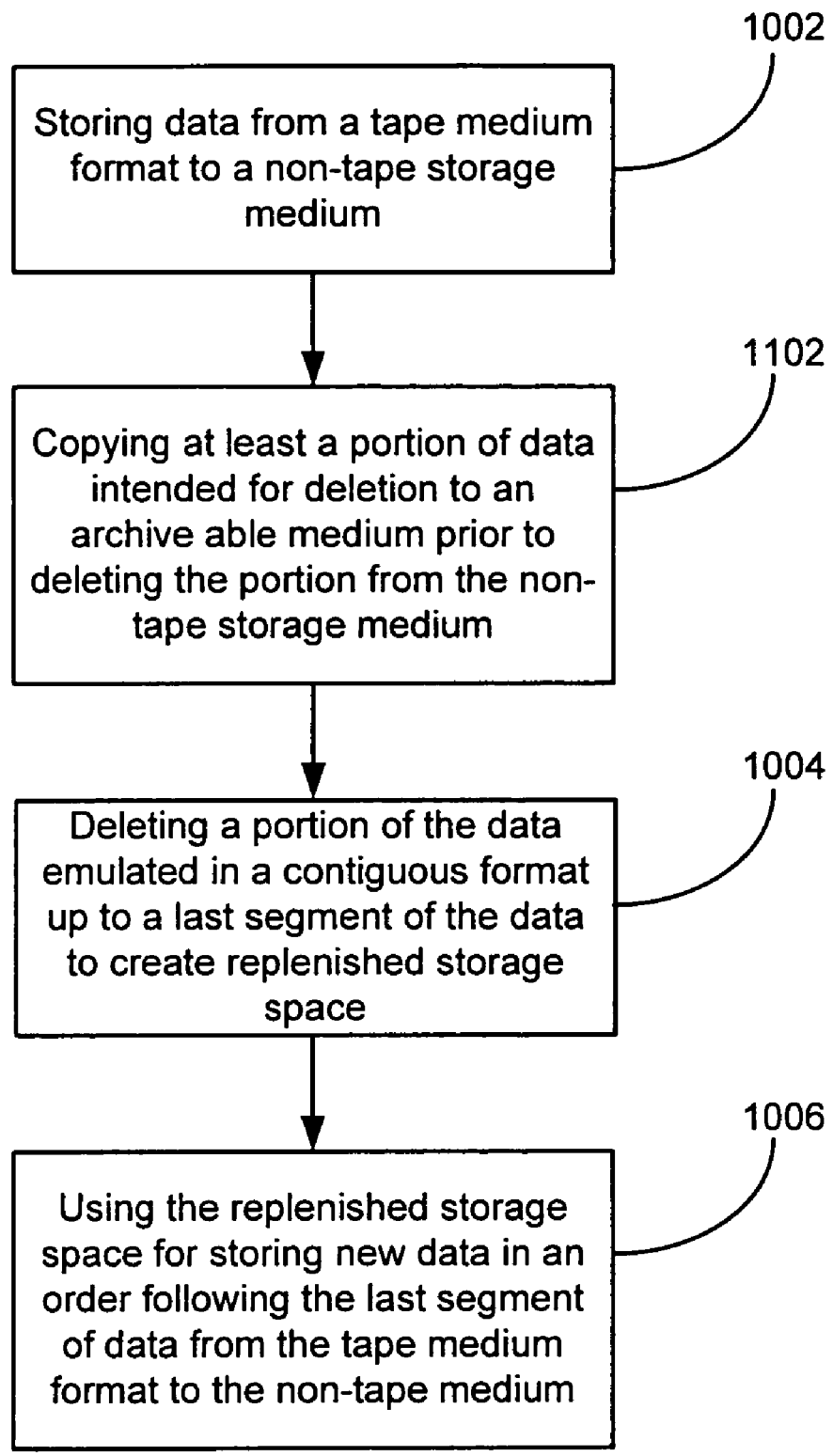
FIG. 11 is an alternative embodiment of the present invention which includes method steps from FIG. 10.

FIG. 11 is an alternative embodiment of the present invention which includes method steps 1002, 1004 and 1006 from FIG. 10. In step 1102, at least one portion of data intended for deletion is copied to an archive able medium prior to deleting the portion intended for deletion from the non-tape storage medium. Step 1102 can serve as a back-up mechanism for the data deleted from the non-tape storage medium. A means for copying the portion of data intended for deletion to an archive able medium prior to deleting the data portion from the non-tape storage medium can be accomplished by transferring data intended for deletion stored on a disc drive magazine, such as the RXT magazine 201, to tape cassette, for example. This can be done over a network to respective storage systems, such as from an RXT library to a tape library for example, or alternatively between an RXT magazine adapted to communicate directly with a tape drive capable of writing to a tape cassette. These two of examples help serve to illustrate some possibilities for a means supporting step 1102.

Embodiments of the present invention can be commercially practiced, for example, with an RXT T-950 storage system 200 of FIG. 2, performing as a storage system 106, for use with RXT disc drive magazines 201. As previously described, an RXT disc drive magazine 201 encases a plurality of disc drives, such as 308, which can be provided by Seagate Corporation of Scotts Valley, Calif. A host computer 102 is capable of communicating with the RXT T-950 storage system 200 by means of a SCSI tape (streaming) protocol and media changer protocol, such as that provided by Veritas Corporation of Mountain View, Calif., whereby the RXT T-950 storage system 200 can appear in a virtual sense as a traditional tape-based library to the host 102. Hence, data sent to and retrieved from a drive, such as the drive 308, in the RXT T-950 storage system 200 can be in the form of a sequential tape format. In circumstances when storage capacity of an RXT T-950 storage system 200 may be exceeded, an embodiment of the deletion algorithm to "free up", or replenish, space for new data storage can be used while maintaining the emulated linear nature of a tape. Data stored daily can be systematically deleted after a storage life of 90 days to replenish the RXT T-950 storage system 200 with new storage space. The most recent data segment that is not deleted, i.e. data that is less than 90 days old, is reordered, or shifted, in the direction from oldest data to newest data such that any new data stored on the RXT T-950 storage system 200 is stored after the reordered data. This organization maintains the data sequencing in time to accommodate streaming data format. In an alternative embodiment, select portions of data can be deleted from the RXT T-950 storage system 200 based on an expiration parameter. One example can include company personnel data base wherein information pertaining to an employee that is no longer employed by the company is selectively deleted from the data stream, such as the data stream 900 in FIG. 9. In this example the data remaining on the RXT T-950 storage system 200 can be compressed into a tape emulated contiguous data stream whereby the space from the deleted information pertaining to the employee can be reordered to follow all other data for new data storage.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the order of data files, such as those shown in FIG. 9A, can be ordered in a sequence other than oldest data to newest data while still maintaining substantially the same functionality without departing from the scope and spirit of the present invention. Further, the reordering of data, such as in FIG. 9C, can have a different sequence in file order without departing from the scope and spirit of the present invention. Finally, although the preferred embodiments described herein are directed to random access media, such as the disc drive 308, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage arrangement comprising:
   a host computer;
   a storage system in communication with the host computer, the storage system comprising at least one random access storage medium;
   the random access storage medium capable of receiving data by streaming protocol and wherein the received data is stored contiguous possessing at least one data file containing a plurality of records wherein each of the records contains user data and meta data;
   a deletion algorithm adapted to issue at least one deletion command capable of deleting at least one portion of the data stored on the medium up to at least a last segment of the data to create replenished storage space;
   the replenished storage space shifted to being in a physical location following the last segment, wherein the replenished storage space is capable of storing new data in an order physically following the last segment of data upon receiving the new data in the streaming protocol by the storage medium.

2. The data storage arrangement of claim 1 wherein the streaming protocol is a SCSI tape protocol.

3. The data storage arrangement of claim 1 wherein the data and the new data are stored in a format for the streaming protocol.

4. The data storage arrangement of claim 1 wherein the communication between the host and the storage system is by streaming protocol.

5. The data storage arrangement of claim 1 wherein the deletion command is issued by at least one of the group consisting of: the host, the storage system and the random access storage device.

6. The data storage arrangement of claim 1 wherein the random access storage medium is from the group consisting of: flash memory, optical media, magnetic disc drive, disc drive magazine, magneto-optical drive, RAM semiconductor memory, and floppy disc.

7. The data storage arrangement of claim 1 wherein the deleted portion of data is only user data.

8. The data storage arrangement of claim 1 wherein the deletion algorithm is adapted to issue the at least one deletion command automatically for deleting the portion of the data based on a predetermined time limit from when the data portion was originally stored.

9. The data storage arrangement of claim 1 wherein the portion of the data for the deleting is expired data.

10. The data storage arrangement of claim 9 wherein the expired data is the portion of data that has aged to a time limit from when the portion of the data was originally stored.

11. The data storage arrangement of claim 9 wherein the expired data is from the group consisting of: a name, a date, a quantity of data portions saved, a time interval.

12. The data storage arrangement of claim 1 wherein the at least one deletion command is capable of deleting the at least one portion of the data stored on the medium post at least a first segment of the data.

13. The data storage arrangement of claim 12 wherein the at least one portion of the deleted data comprises a plurality of non contiguous data portions relative the emulated format.

14. A method for replenishing storage space on a non-tape storage medium comprising the steps of:
   storing data in a tape medium format to the non-tape storage medium;
   deleting at least one portion of the data up to a last segment of the data to create a deleted space;
   shifting the last segment of the data to essentially the beginning of the deleted space; and
   using the remainder of the deleted space for storing new data in the tape medium format.

15. The method of claim 14 wherein the deleting step is done when the portion of the data has aged to a time limit from when the portion of the data was originally stored.

16. The method of claim 14 wherein the portion of data is only user data.

17. The method of claim 14 wherein the deleting step is done when the portion of the data contains expired data.

18. The method of claim 14 further comprising copying the portion of the data to an archive able medium prior to deleting the portion from the non-tape storage medium.

19. A means for replenishing storage space on a non-tape storage medium comprising:
   means for storing data from a tape medium format to the non-tape storage medium;
   means for deleting a portion of the data up to a last segment of the data to create replenished storage space; and
   means for utilizing the replenished storage space for storing new data in an order following the last segment of data from the tape medium format to the non-tape medium.

20. The means of claim 19 further comprising a means for determining the portion.

21. The means for claim 19 further comprising means for copying the portion to an achievable medium prior to deleting the portion from the non-tape storage medium.

22. A library for storing and retrieving data, comprising
- at least one non-tape medium having a storage capacity and data stored therein in a tape medium format,
- wherein the storage capacity of the non-tape medium is at least partially refreshed by deleting at least one portion of the data in the tape medium format up to a last segment of the data, thus, creating a deleted space, and reordering the last segment of data at essentially the beginning of the deleted space;
- and new data adapted to be stored physically after the last segment of the data is reordered.

* * * * *